US 8,056,472 B2

(12) United States Patent
Beaufort et al.

(10) Patent No.: US 8,056,472 B2
(45) Date of Patent: Nov. 15, 2011

(54) TWINE ARM ASSEMBLY

(75) Inventors: David Beaufort, Arc-les-Gray (FR);
Frédéric Paillet, Gray (FR); Pascal Gresset, Arc-les-Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/560,745

(22) Filed: Sep. 16, 2009

(65) Prior Publication Data

US 2010/0251910 A1  Oct. 7, 2010

(30) Foreign Application Priority Data

Sep. 23, 2008 (EP) ..................... 08164926

(51) Int. Cl.
*B65B 13/18* (2006.01)
*A01F 15/14* (2006.01)
(52) U.S. Cl. ................. 100/5; 100/13; 100/88
(58) Field of Classification Search ........... 100/5, 6, 100/13, 19 R, 88; 56/341
See application file for complete search history.

(56) References Cited

U.S. PATENT DOCUMENTS

| 2,604,844 | A | | 11/1946 | Hill | |
|---|---|---|---|---|---|
| 4,715,175 | A | * | 12/1987 | Schaible et al. | 56/432 |
| 5,437,226 | A | * | 8/1995 | Wagstaff | 100/5 |
| 5,465,658 | A | * | 11/1995 | Wagstaff et al. | 100/5 |
| 7,104,189 | B2 | * | 9/2006 | Bandstra | 100/5 |

FOREIGN PATENT DOCUMENTS

| DE | 19742003 | 4/1999 |
|---|---|---|
| EP | 0 085 817 | 8/1983 |
| SU | 1303071 | 4/1987 |

OTHER PUBLICATIONS

Eurasian Search Report, 4 Pages, Jan. 28, 2010.

* cited by examiner

*Primary Examiner* — Jimmy T Nguyen

(57) ABSTRACT

A twine arm assembly is provided with a guide member controlling the movement of a twine arm during a tying cycle. In order to facilitate the insertion of new twine into the twine arm, said guide member is made of two parts which can be locked to each other or which can move with respect to each other in order to bring the twine arm into a position, in which twine can be inserted easily.

9 Claims, 6 Drawing Sheets

TWINE ARM ASSEMBLY

FIELD OF THE INVENTION

This invention relates to a twine arm assembly for use with a round baler. The twine arm assembly has a twine arm with a guide section and a control section, being moveably connected to each other and moveable as a unit between a tying position and a rest position. A guide member is connected to one section.

BACKGROUND OF THE INVENTION

DE 197 42 003 A1 discloses in FIGS. 4-7 a twine arm assembly having two carriers each for two twine arms. Both carriers are pivoted by a motor and controlled by a linkage connected at there ends to a frame of a round baler. The twine arms are moveable between a rest position close to a center area of the round baler and underneath a tongue, and a twine delivery position close to a side area of the round baler.

SUMMARY OF THE INVENTION

The problem addressed by the invention thus is seen in the difficulty of an operator to insert twine into the twine arm, when new twine shall be used.

According to the invention the guide member can be brought into a position or decoupled or changed or altered in any other way such that the guide section can be brought into a position, where twine can be inserted easily. Such a position may be at the side area of the round baler, where it is easy to reach. Also, the guide section may be pivoted during insertion of the twine, to make insertion as convenient for an operator. The guide member can be collapsible, foldable, telescopically adjustable, or can consist of a flexible means such as a rope, a wire, a chain or the like. It is also possible to provide for a coupling of the guide member on the control or guide section, which can be decoupled easily making the guide section freely moveable. Movement of the guide section may happen in or transverse to the twine arm movement plane during operation, i.e. horizontally or vertically. The control section may consist of several components or be a single unit.

In order to assure, that the guide member is stable during operation, but flexible when the twine is inserted, a lock is provided. The lock may be formed as a bolt, pin, spring pin or the like engaging a hole, a spring loaded detent, a simple motor or a self-locking positive lock between the two parts.

A simple design for connecting the two parts is a bearing, which makes both parts pivotable on each other. The bearing may include the lock or not.

When the guide section is arranged between the guide member and the control section, it follows, that the guide member is provided on the outside of the assembly, where it is easily accessible for bringing the assembly into a condition, where the twine can be fed.

The tying cycle of the baler is shortened if two units or sets are provided for delivering twine and even more, if each set has two twine outlets, rather than one only.

Synchronization of the movement of both twine guide sections and control sections is achieved, if both control sections are connected among each other by a linkage, such as a rod, a cable, fluid line, etc.

In order to save parts and costs and to increase reliability it is helpful to have one actuator acting upon either of the control sections, which transmits its movement to the other control section by means of the linkage. Such an actuator may be a hydraulic, electric or pneumatic motor or a mechanical lever.

In order to further facilitate the insertion of twine into the guide section twine guide members are provided on the guide section and/or on the guide member, which have an element biased against a fixed or moveable element, between which a gap is formed to receive twine. These elements can be shims, discs, plates, etc. which are under the pressure of a spring and which abut other shims, etc. or one of the sections or the guide member, a frame, etc. and form a gap, preferably in V-shape, into which a twine strand can be inserted radially, rather than through an eyelet, a hole, a tube or the like.

Deactivating the tensioner in the twine guide helps to feed the twine into the bale chamber, since it does not create any resistance. Such deactivation may happen manually or mechanically, if the twine guide and tensioner during its movement abuts a stop, cam, or the like; or it may be deactivated electrically.

Round balers for agricultural or industrial products of variable or fix chamber type are very suitable for one or more twine arm assemblies according to the invention.

BRIEF DESCRIPTION OF THE DRAWINGS

Embodiments of the invention are described in more detail below with reference to the accompanying drawings wherein.

DESCRIPTION OF THE PREFERRED EMBODIMENT

Figure 1:
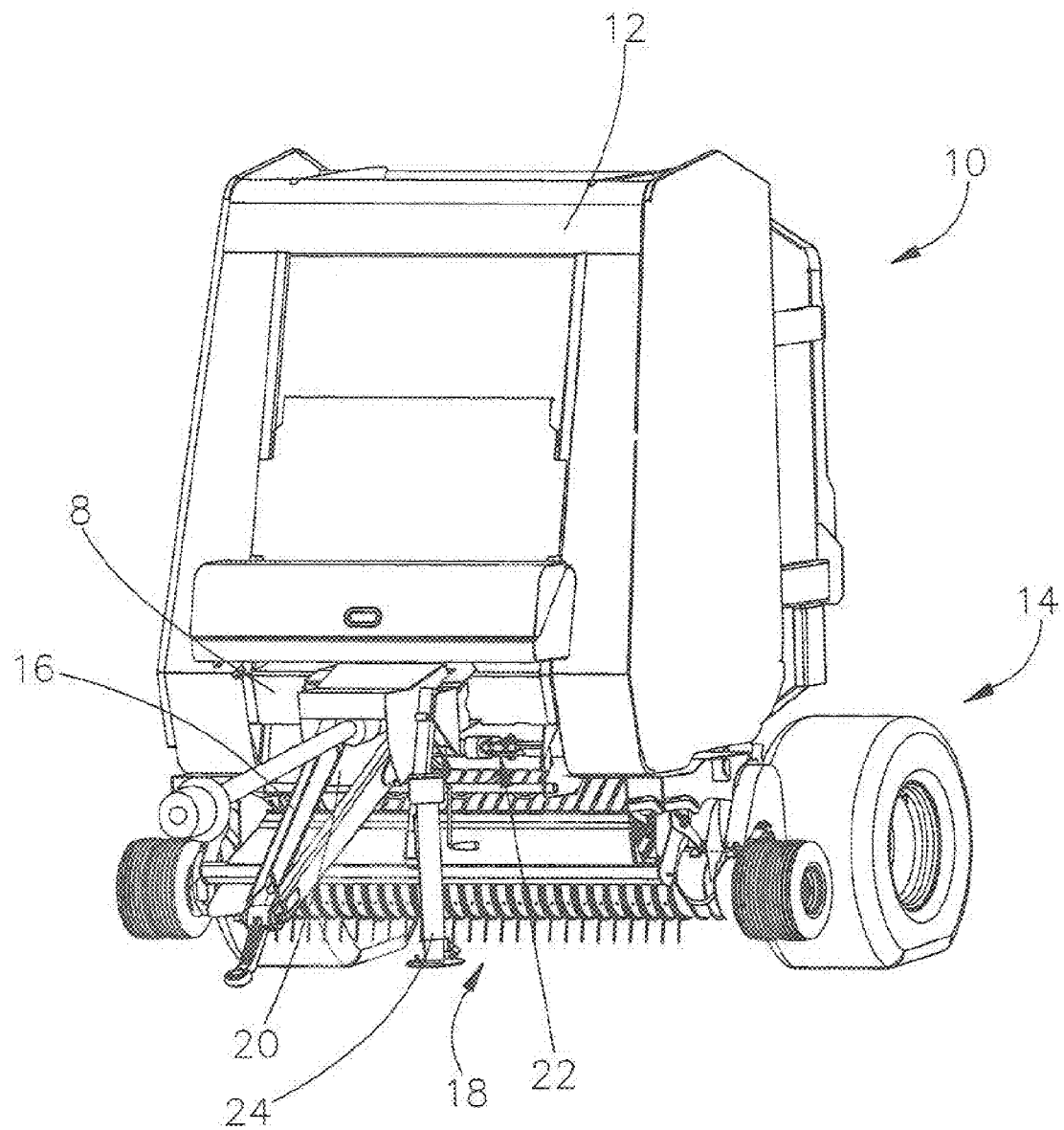
FIG. 1 is a front perspective view of a round baler having a twine arm assembly.

As shown in FIG. 1 a round baler 10 has a frame 12, a chassis 14, a tongue 16, a pick-up 18, an inlet 20 to a bale chamber (not shown). A twine arm assembly 22 is shown in further detail in FIGS. 2-4.

The round baler 10 is of an ordinary variable chamber type, which forms cylindrical bales from crop lying on a field; such round balers 10 are widely known.

A frame 12 is supported on the chassis 14 and can be coupled to a tractor or the like by means of the tongue 16 to be pulled over the field. The tongue 16 extends forwardly from a frame cross beam 8 and gets wider from the front to the rear, whereas the wide rear part together with a jack stand 24 and other components like a transmission, steps, hydraulic couplers etc. cover a substantial part above the pick-up 18 and tend to obstruct access to it.

The pick-up 18 extends at least over the full width of the round baler 10 or even beyond of it and can be lifted and lowered during operation. Usually a baffle (not shown) is provided above the pick-up 18 and below the tongue 16, which assists in feeding the crop taken up by the pick-up 18 into the inlet 20. When the pick-up 18 is in an upper position and/or when crop is on the pick-up 18 there is very little space between the pick-up 18 and the underside of the tongue 16 and the cross beam 8 of the frame 12.

The inlet 20 is located behind or downstream of the pick-up 18 and allows crop to enter into a bale chamber. Twine 26 also enters the bale chamber at the inlet so as to be routed around the peripheral surface of the bale inside the bale chamber, as is widely known.

The twine arm assembly 22 is located underneath the cross beam 8 of the frame 12 and underneath the tongue 16 and feeds twine 26 through the inlet 20 into the bale chamber, where it is caught by a rotating bale. Further reference is made to FIGS. 2-4.

Figure 2:
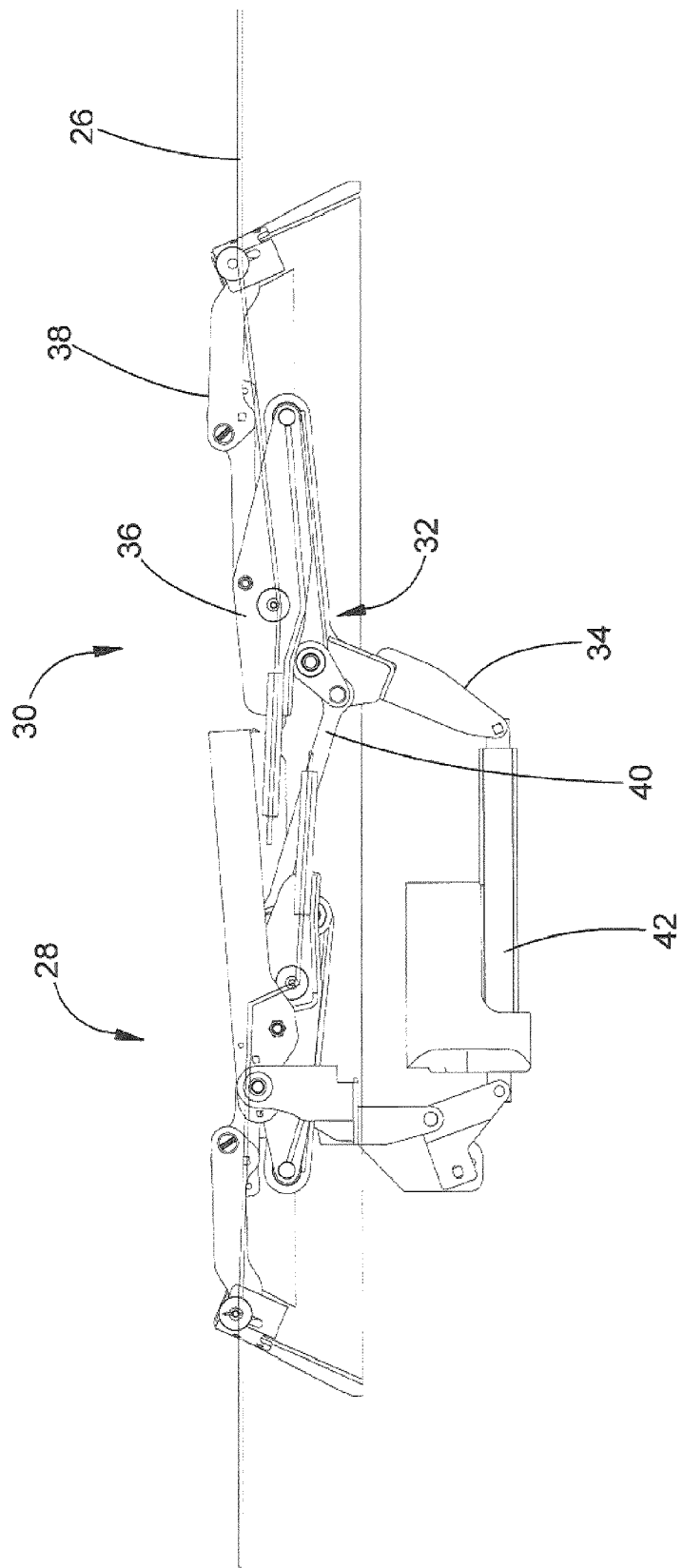
FIG. 2 is a top view of the twine arm assembly in a rest position.
Figure 3:
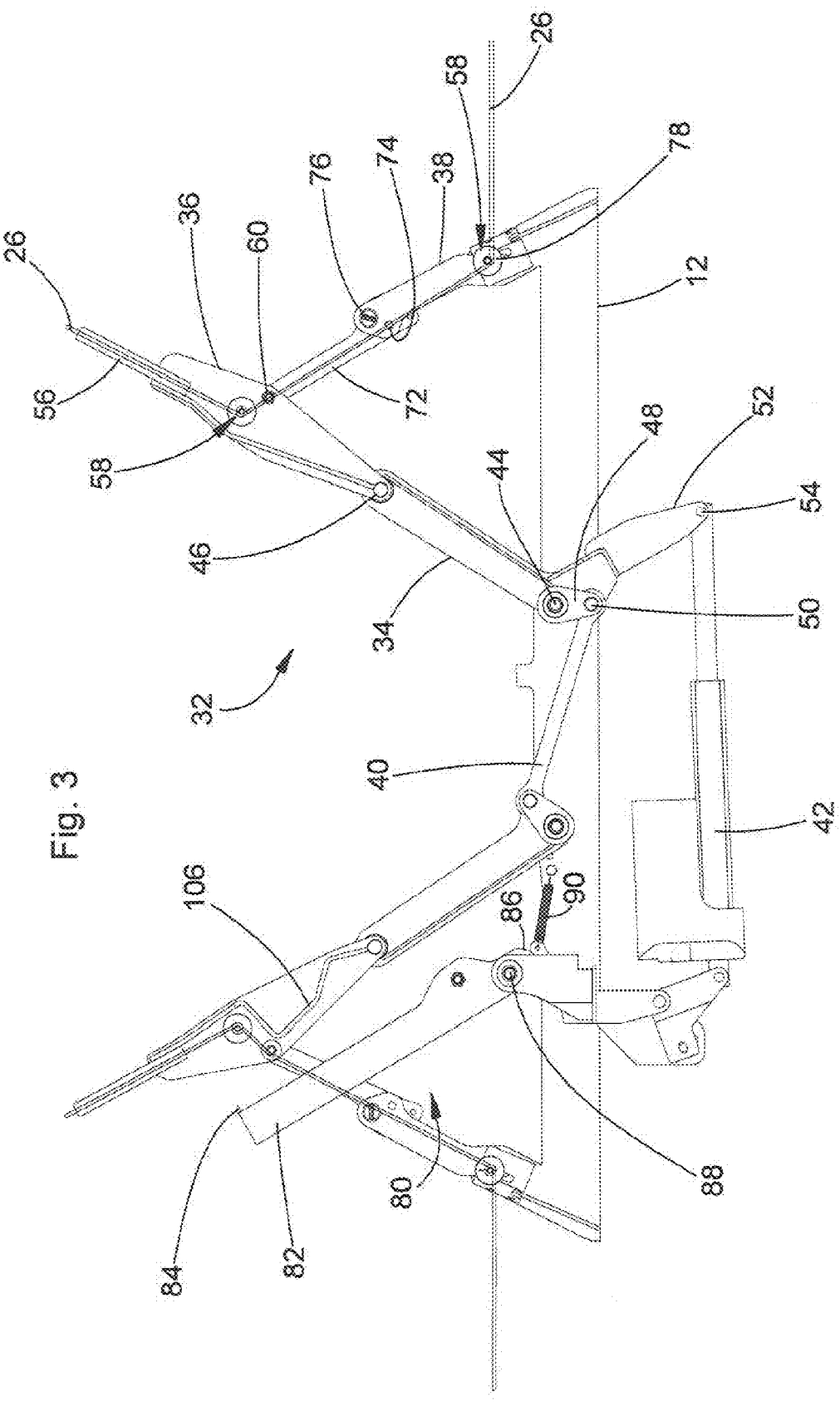
FIG. 3 is a top view of the twine arm assembly in an operating position.

As shown in FIG. 2 the twine arm assembly 22 consists of two units 28 and 30, each having a twine arm 32 with a control section 34 and a guide section 36, and a guide member 38. The two units 28, 30 are interconnected by means of a linkage 40 and are commonly operated by an actuator 42. While in this case two units 28 and 30 are present, there could be more or less. These units 28, 30 are substantially of the same design but are arranged in a mirror image fashion.

The control sections 34 are formed substantially as a straight bar, rod, tube or sheet metal with reinforcements and provided with a front bearing 44 and a rear bearing 46 in the respective end region. In the front end region a short lever 48 is provided, having a bearing 50 being eccentric to the front bearing 44. In addition a cantilever 52, substantially longer than the short lever 48, is attached to the control section 34 of the left control section 34 and extends from latter under an angle of about 90 degrees. "Left" and "Right" are meant as seen from the perspective of a person looking into the forward drive direction of the round baler 10. In the free end area of the cantilever 52 a bearing 54 is provided. Bearings 44 are connected to the frame 12 at the underside of the cross beam 8 and enable the control section 34 to pivot horizontally with respect to the frame 12 approximately 135 degrees between a position transverse to the driving direction of the round baler 10 and about 45 degrees inclined to it.

The guide section 36 is formed of sheet metal with reinforcement elements and has a twine tube 56, a twine guide and tensioner 58, a bearing 60 and the bearing 46. The twine tube 56 is located at the end opposite the bearing 46. While the bearing 46 connects the guide section 36 to the control section 34, the twine tube 56 is located at the free end of the guide section 36 and extends beyond that, although this is not really necessary. The twine 26 runs to the twine tube 56 and is brought to the surface of the bale. The bearing 60 is located between the twine tube 56 and the bearing 46 and the twine guide and tensioner 58 is located quite close to it. The twine guide and tensioner 58 comprises two shims 62 of a frustrum shape arranged about an axis 64 and pressed onto each other by means of a spring 66, retained and tensioned by a nut 68. Due to the frustrum shape of the shims 62 a V-shaped gap is provided, into which the twine 26 is inserted. One of the reinforcements is formed as a catcher 106 with a cavity, which is suitable to receive bearing 88, as will be described later.

The guide member 38 comprises two parts 70, 72, which are pivotably connected to each other by means of a bearing 74, and a lock 76. Part 70 is pivotably received with one end on a bearing 78 fastened to the frame 12, whereas the bearing 74 is provided at the opposite end. Another twine guide and tensioner 58 is arranged on the bearing 78. The other part 72 is pivotably received with one end area on bearing 74 and with the other end area on bearing 60. In the situation shown in FIG. 3 the twine arm 32, the guide member 38 and the part of the frame 12 between the bearing 44 and 78 form a triangle with substantially similar length of its edges. The lock 76 is provided laterally of the bearing 74 and is able to allow or prevent a pivoting movement of the parts 70, 72 relative to each other.

Figure 6:
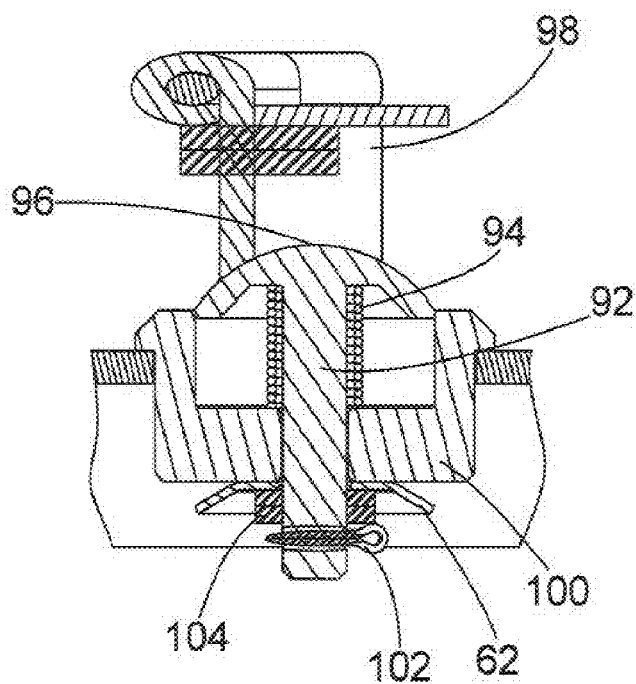
FIG. 6 is a cross-sectional view of a twine guide and tensioner in a deactivated position; and, FIG. 7 is the twine guide and tensioner of FIG. 6 shown in an activated position.
Figure 7:
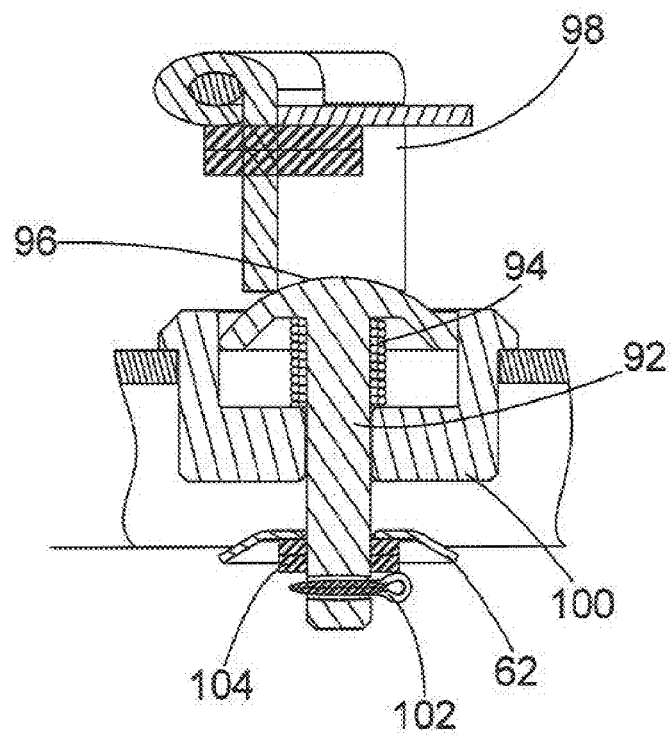

As shown in FIGS. 6 and 7, the twine guide and tensioner 58 can be activated and deactivated, depending on its position. This is achieved by using a pin 92, another spring 94, a contact area 96 and an activator 98. The pin 92 protrudes either the control section 34 or the guide section 36 and is slidably received in a housing 100 fixed to either of the sections 34, 36. The pin 92 terminates at one end with the contact area 96 and the spring 94, being formed as a coil spring, extends between the underside of the contact area 96 and the bottom of housing 100, in order to move the contact area 96 away from the housing 100. On the other side of the housing 100 shim 62 is received on the pin 92 to form a gap between the shim 62 and the housing 100, into which the twine 26 can enter. The shim 62 is kept in place by a cotter pin 102 and discs 104. Activator 98 is fastened either to the frame 12, to the cross beam 8 or e.g. to an extended portion of part 72. It is only important to locate the activator 98 such, that it abuts the contact area 96, when the twine arm assembly 22 assumes its tying starting position, and depresses the pin 92 by contacting the contact area 96 against the virtue of the spring 94, such that the gap between disc 62 and the underside of the housing 100 gets bigger and lets the twine 26 pass without resistance.

The linkage 40 is formed as a rod being connected at each end to the bearing 50 on the control sections 34, whereas the bearings 50 and thus the linkage 40 are arranged opposite of a plane through bearings 44 to provide for a mirror image like movement of both units 28, 30. While the linkage 40 shown is of a fixed length, it could also be adjustable in length.

The actuator 42 is shown as a hydraulic motor, which is attached to the frame 12 at one end and in bearing 54 to the cantilever 52 at the other end. The actuator 42 could also be an electric motor that is connected to a power source and a control as is known.

Finally a separating assembly 80 is provided to cut the twine 26, when the tying cycle is over. The separating assembly 80 comprises a beam 82 with a knife 84 at one end and a lever arm 86 at the opposite end. The beam 82 is journalled on a bearing 88 on the frame 12 in the same plane as the twine arms 32. The lever arm 86 extends beyond the bearing 88 and has an eyelet to hold one end of a spring 90, which at the other end is connected to the frame 12. The spring 90 is a tension coil spring, which urges the beam 82 about the bearing 88, such, that it pivots outwardly. The arrangement of the bearing 88 and of the beam 82 and its lever arm 86 is such, that the right hand control section 36 touches the beam 82, when it moves towards the rest position as shown in FIG. 2, by means of a cam 92 and a bearing 91 or similar. The extensions of control sections 34 and 36 perpendicular to the plane of movement are designed such, that said bearing 91 may pass the arm 34, but not the arm 36 with the cam 92.

In light of the preceding structural description the function of the twine arm assembly 22 is described as follows.

The tying operation starts from the situation shown in FIG. 2, whereas the two parts 70, 72 of the guide member 38 are locked, i.e. they form a substantially straight element. When the actuator 42 is extended, it will swing cantilever 52 about the bearing 44 and with it control section 34 of the left unit 30. Due to the connection via linkage 40 the control section 34 of the right unit 28 is pivoted. Since the guide sections 36 of both units 28, 30 are connected via guide member 38 to the frame 12, the movement of the guide section 36 is controlled, such that it assumes the position shown in FIG. 3 close to the side of the round baler 10. In this position the twine tube 56 gets closest to the bale and brings the twine 26 in connection with it for getting wound about it. When the actuator 42 is retracted again, the twine arms 32 will again move towards their rest position shown in FIG. 2, whereas the right control section 34 moves the beam 82 with its knife 84 through the abutment of bearing 88 in the catcher 106 towards the strands of the twine 26, which accumulate in the center of the round baler 10. When the knife 84 hits the twine 26 and pushes it against the frame 12, the strands are separated. The spring 90 helps to bring the beam 82 out of the way of the twine arms 32, once the tying operation starts.

Figure 4:
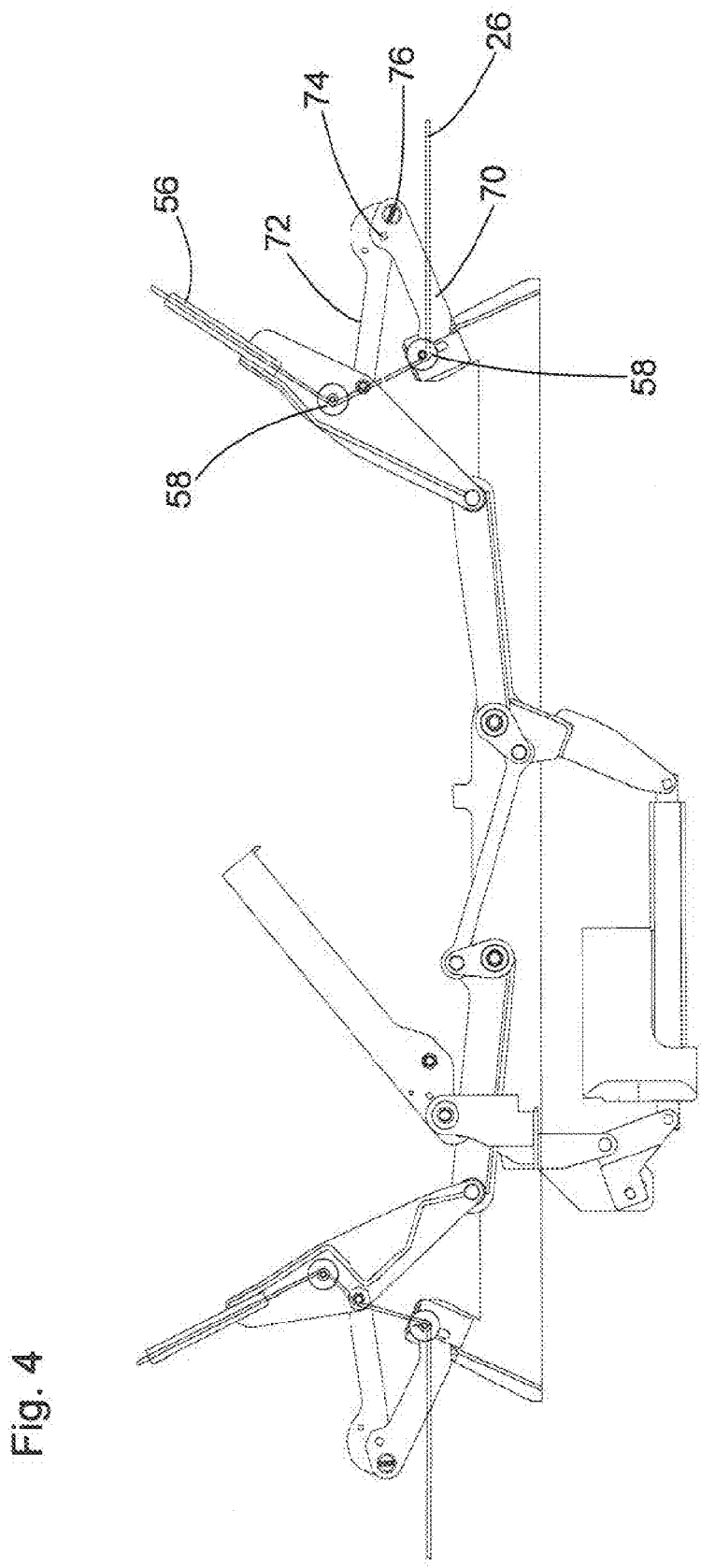
FIG. 4 is a top view of the twine arm assembly in the rest position, whereas a guide member is in a service condition.
Figure 5:
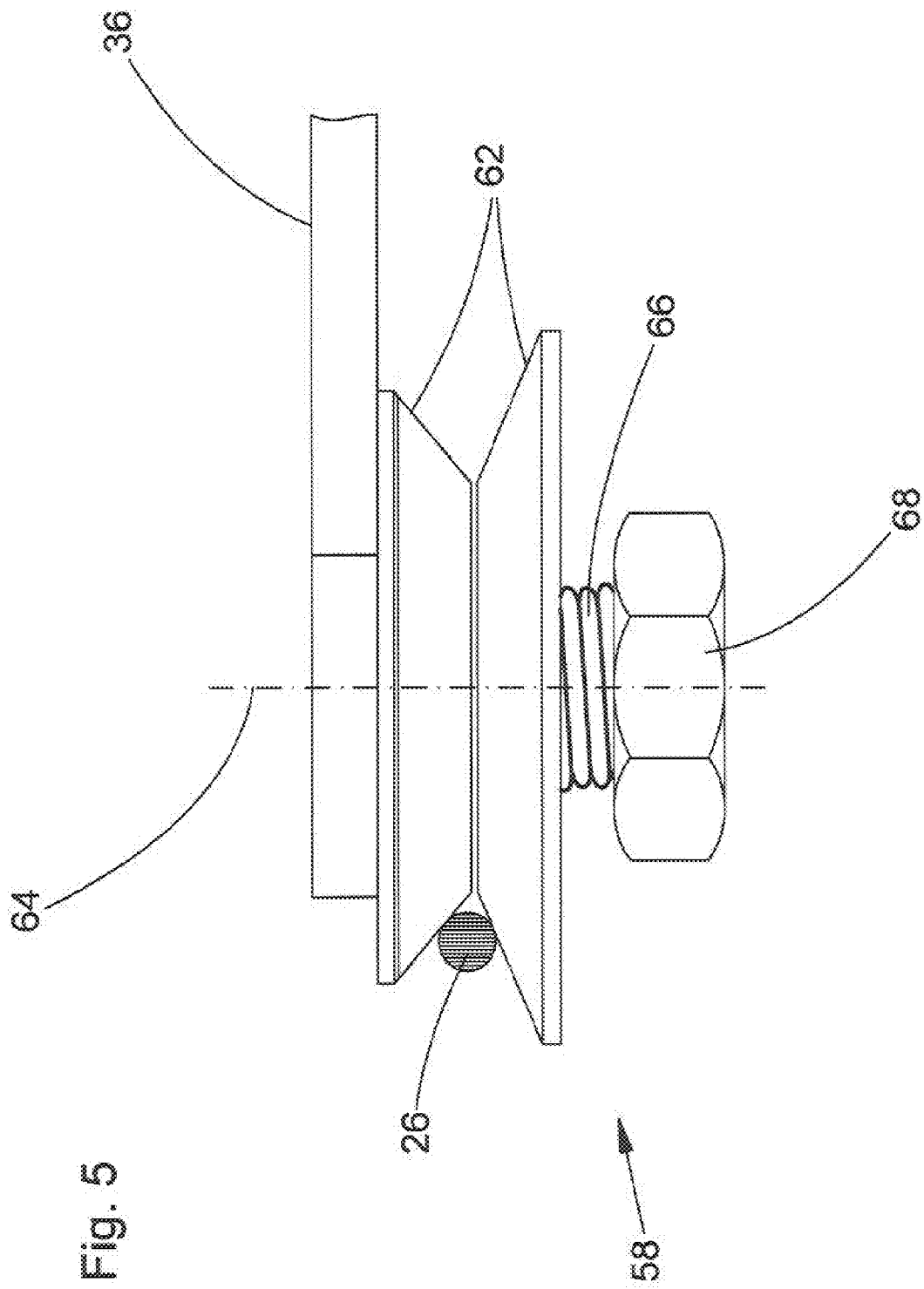
FIG. 5 is a side view of the twine guide means.

In order to insert twine 26 into the twine tube 56 in the rest position shown in FIG. 2, the lock 76 is released and the two parts 70, 72 can collapse, such that the guide section 36 assumes the position shown in FIG. 4 at the side of the round baler 10 and possibly even beyond its lateral edge, where the access is free. When the twine 26 is inserted into the twine tube 56 it is pulled radially into the twine guide and tensioner 58, where it is tensioned and guided. Once the twine 26 is inserted and pulled through the short twine tube 56, the parts 70, 72 are brought back into their normal position and locked.

Having described the preferred embodiment, it will become apparent that various modifications can be made without departing from the scope of the invention as defined in the accompanying claims.

The invention claimed is:

1. A twine arm assembly for a round baler, the assembly having a first twine arm with a guide section and a control section, the guide section and the control section being moveably connected to each other and moveable as a unit between a tying position and a rest position, and having a guide member connected to one section of the guide section, wherein the guide member comprises two parts, the two parts can be collapsed and partially disconnected from one another to allow a relative movement between the two parts such that the twine arm is brought into a stop at a position different from the tying and rest positions to facilitate the treading of the twine into a twine tube of the guide section.

2. A twine arm assembly according to claim 1, wherein the guide member further comprises a lock, wherein the lock selectively rigidly connects the two parts to each other and allows a relative movement between them.

3. A twine arm assembly according to claim 1, wherein the two parts connected to each other in a bearing.

4. A twine arm assembly according to claim 1, wherein the guide section is arranged between the guide member and the control section.

5. A twine arm assembly according to claim 1, further comprising a second twine arm consisting of a guide section, a control section and a guide member, wherein the first and second twine arms are arranged in a mirror image fashion.

6. A twine arm assembly according to claim 5, wherein the control sections of the twine arms are interconnected by a linkage.

7. A twine arm assembly according to claim 5, wherein an actuator is provided for acting upon either of the control sections.

8. A twine arm assembly according to claim 1, wherein a twine guide and tensioner is provided on at least one of the guide section and the guide member, wherein the twine guide and tensioner has an element biased against an element, between which a gap is formed to receive twine.

9. A twine arm assembly according to claim 8, wherein a tensioning effect of the twine guide and tensioner is suspended at the beginning of a tying cycle.

* * * * *